US009552184B2

(12) United States Patent
Yagi et al.

(10) Patent No.: US 9,552,184 B2
(45) Date of Patent: *Jan. 24, 2017

(54) FACSIMILE APPARATUS AND METHOD FOR PRINTING FACSIMILE

(71) Applicants: KABUSHIKI KAISHA TOSHIBA, Tokyo (JP); TOSHIBA TEC KABUSHIKI KAISHA, Tokyo (JP)

(72) Inventors: Norifumi Yagi, Tokyo (JP); Takao Ishida, Kanagawa (JP); Kanya Hiroi, Kanagawa (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/019,332

(22) Filed: Feb. 9, 2016

(65) Prior Publication Data

US 2016/0154619 A1 Jun. 2, 2016

Related U.S. Application Data

(63) Continuation of application No. 13/965,290, filed on Aug. 13, 2013, now Pat. No. 9,282,221.

(51) Int. Cl.
    *H04N 1/00* (2006.01)
    *H04N 1/60* (2006.01)
    *G06F 3/12* (2006.01)

(52) U.S. Cl.
    CPC .......... *G06F 3/1261* (2013.01); *G06F 3/1219* (2013.01); *G06F 3/1253* (2013.01); *H04N 1/00* (2013.01); *H04N 1/60* (2013.01); *H04N 1/6097* (2013.01)

(58) Field of Classification Search
    CPC ....................................................... G06F 3/1261
    See application file for complete search history.

(56) References Cited

U.S. PATENT DOCUMENTS

| | | | | |
|---|---|---|---|---|
| 5,963,340 | A * | 10/1999 | Kim | ............... H04N 1/32005 358/404 |
| 6,611,354 | B1 | 8/2003 | Nakahara | |
| 8,358,323 | B2 * | 1/2013 | Bray | .................. B41J 2/4753 347/104 |
| 2011/0012969 | A1 | 1/2011 | Brewington et al. | |
| 2012/0013945 | A1 | 1/2012 | Suzuki | |
| 2012/0038941 | A1 | 2/2012 | Megawa | |
| 2012/0170064 | A1 | 7/2012 | Hibino et al. | |

* cited by examiner

*Primary Examiner* — King Poon
*Assistant Examiner* — Ibrahim Siddo
(74) *Attorney, Agent, or Firm* — Patterson & Sheridan, LLP

(57) ABSTRACT

A facsimile apparatus according to an embodiment includes a communication interface that receives facsimile data, a data storage device, a non-decolorable printing section, a decolorable printing section and a processor. The data storage device stores, prior to the facsimile data being received, a plurality of facsimile transmission source information. The data storage device also stores the received facsimile data. The processor controls printing of the content of the received facsimile data in one of the non-decolorable printing section and the decolorable printing section based on whether a detected transmission source information is determined to be included in the previously stored plurality of facsimile transmission source information.

7 Claims, 7 Drawing Sheets

FIG. 5

<SETTING OF PRINTING MODE>

○ FIRST PRINTING MODE — DECOLORABLE PRINTING IS PERFORMED IN OVERALL FAX IMAGES

○ SECOND PRINTING MODE — DECOLORABLE PRINTING IS PERFORMED IN FOLLOWING
- FAX FROM TELEPHONE NUMBER WHICH IS NOT REGISTERED
- FAX FROM CALLING SOURCE OF WHICH TELEPHONE NUMBER IS NOT ACQUIRED

◎ THIRD PRINTING MODE — DECOLORABLE PRINTING IS PERFORMED IN FAX FROM TELEPHONE NUMBER LISTED IN REGISTRATION NUMBER LIST

FIG. 6

<OTHER SETTINGS OF PRINTING>

○ OTHER SETTING 1 — HEADER IS PRINTED WITH NON-DECOLORABLE TONER

◎ OTHER SETTING 2 — FOLLOWING IS PRINTED WITH DECOLORABLE TONER
- COMMUNICATION REPORT, ERROR REPORT, SETTING LIST ( CANCEL )    ( REGISTRATION )

FIG. 8

| No. | TRANSMISSION SOURCE TELEPHONE NUMBER | RECEIVING DATE AND TIME | NUMBER OF SHEETS |
|-----|--------------------------------------|-------------------------|------------------|
| 001 | 0559-76-**** | 2013/04/01 11:00 | 2 |
| 002 | TECH MAIN OFFICE (OSAKI) | 2013/04/02 03:03 | 5 |
| 003 | | | |

LIST OF RECEIVED ON-PRINTED FAX

CANCEL — DECOLORABLE PRINTING (83) — NON-DECOLORABLE PRINTING (84)

81

FACSIMILE APPARATUS AND METHOD FOR PRINTING FACSIMILE

CROSS-REFERENCE TO RELATED APPLICATION

This application is a continuation of U.S. patent application Ser. No. 13/965,290, filed on Aug. 13, 2013, the entire contents of which are incorporated herein by reference.

FIELD

Embodiments described herein relate generally to a facsimile apparatus and a method for printing a facsimile.

BACKGROUND

Recently, an apparatus in which letters and images printed on a paper are decolored so that the paper can be used again, has become practicable. Such an apparatus has an advantage that the paper, which is decolored can be used many times and paper can be saved. However, there are some apparatus in which printing without decoloring is preferable depending on a content of printed data. In addition, an image forming apparatus that includes a mechanism which performs printing using a general non-decoloring recording material and a mechanism which performs printing using a decolorable recording material is known.

DESCRIPTION OF THE DRAWINGS

FIG. 5 illustrates a setting screen example of a printing mode, according to the first embodiment.

FIG. 6 illustrates a second setting screen example of the printing mode, according to the first embodiment.

FIG. 8 illustrates a display example of a received FAX list, according to the second embodiment.

DETAILED DESCRIPTION

Embodiments provide a facsimile apparatus and a method for printing a facsimile which easily perform a non-decolorable printing selectively depending on conditions.

A facsimile apparatus according to an embodiment comprises a receiving section configured to receive facsimile data, a data storage section configured to store the facsimile data received by the receiving section, a non-decolorable printing section configured to print a content of the facsimile data using a non-decolorable recording material, and a decolorable printing section configured to print the content of the facsimile data using a decolorable recording material. The facsimile apparatus further comprises a transmission source information detection section configured to detect transmission source information of the received facsimile data, an accumulation section configured to accumulate in advance a list containing a plurality of facsimile transmission source information, a comparison section configured to determine whether the detected transmission source information of the received facsimile data is included in the list and a printing control section configured to control printing of the content of the received facsimile data in the non-decolorable printing section or in the decolorable printing section, based on the determination by the comparison section.

Hereinafter, an embodiment applied to a multi-function peripheral (MFP) will be described with reference to the drawings. In the present disclosure, "decolor" and related derivative words are used interchangeably with "erase" and related derivative words.

(First Embodiment)

Figure 1:
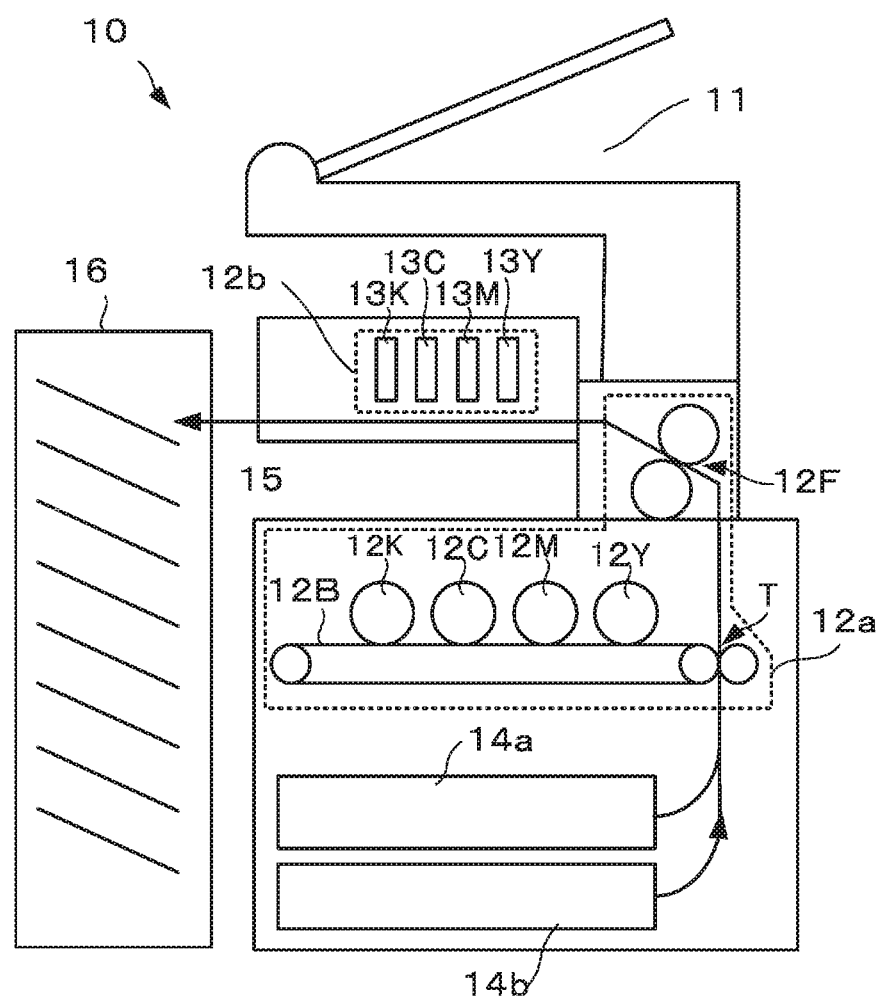
FIG. 1 illustrates a schematic diagram of an apparatus, according to a first embodiment.

FIG. 1 illustrates a schematic diagram of a multi-function peripheral (MFP) 10, according to a first embodiment. The MFP 10 includes an image reading section 11 which scans a document for transmitting facsimile (FAX) data or for copying, a non-decolorable printing section 12a which performs printing using a general non-decolorable recording material, a decolorable printing section 12b which performs the printing using a decolorable recording material, a general paper tray 14a which contains general paper, a decolorized paper tray 14b which contains reusable paper that has been erased of images, and a finisher device 16 provided in an output port 15 from which the printed paper is discharged.

Figure 2:
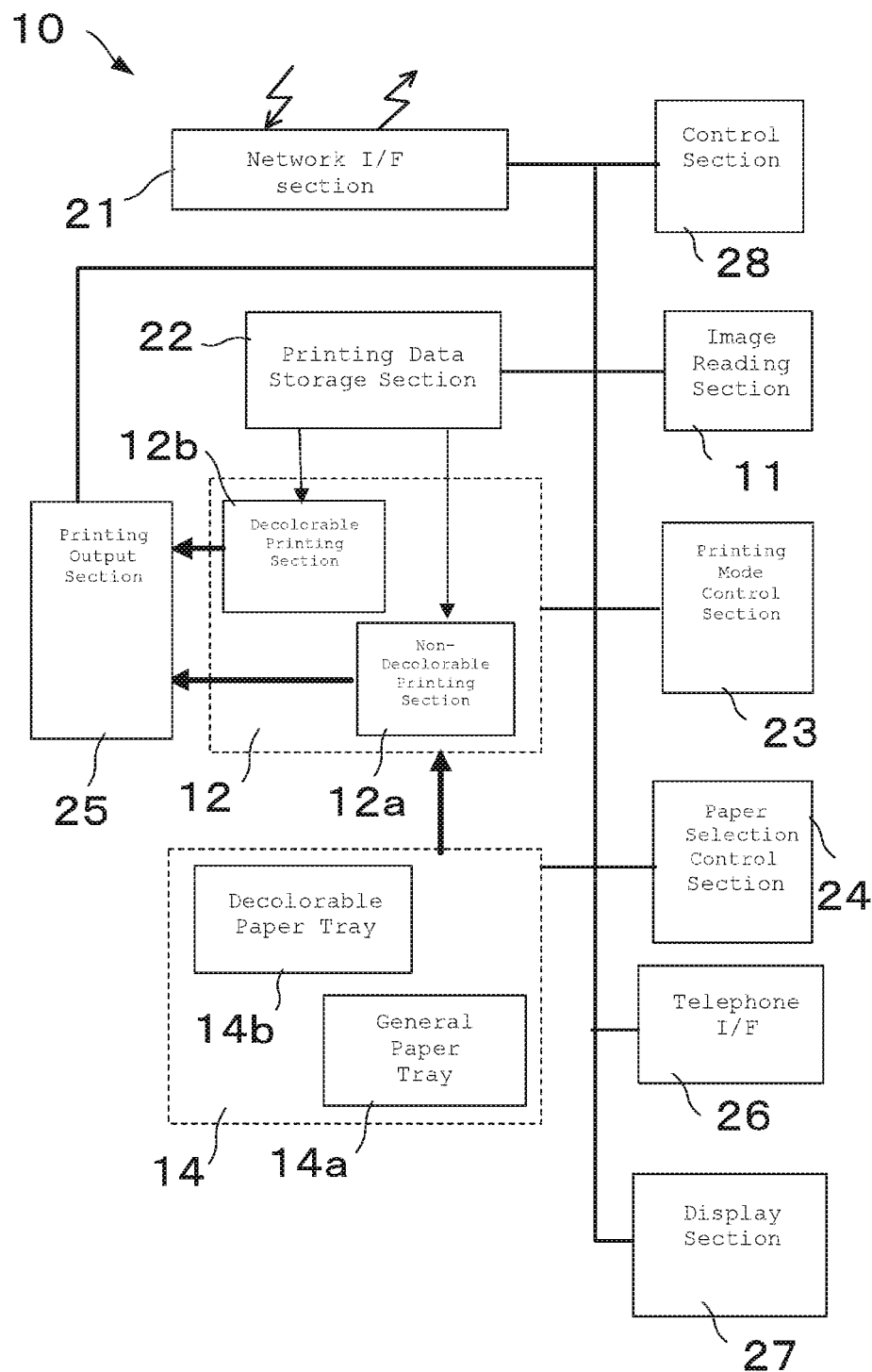
FIG. 2 illustrates a block diagram of the apparatus, according to the first embodiment.

FIG. 2 illustrates a block diagram of the MFP 10. The MFP 10 includes the image reading section 11, a network IF section 21 which performs transmitting and receiving data with other apparatuses via a network such as the Internet, a printing data storage section 22 which stores printing data or the like from other apparatuses or from the image reading section 11, a printing mode control section 23 which determines a printing mode based on the data stored in the printing data storage section 22, a printing section 12 which performs the printing using a general non-decolorable recording material or the printing using a decolorable recording material by inputting the printing data stored in the printing data storage section 22, a paper tray section 14 which contains the general paper and paper on which a decoloring process has been performed, a paper selection control section 24 which selects the paper used in the printing based on a determination result in the printing mode control section 23, a printing output section 25 which outputs the paper printed by the non-decolorable printing section 12a and the decolorable printing section 12b, a telephone IF section 26 which is connected to a telephone line and performs transmitting and receiving of data, a display section 27 which performs the display and an overall control section 28 which controls each section.

The printing section 12 includes the non-decolorable printing section 12a, which performs printing by receiving printing data stored in the printing data storage section 22 and by using the general non-decolorable recording material. The printing section 12 also includes the decolorable printing section 12b which performs printing by using the decolorable recording material. The paper tray section 14 includes the general paper tray 14a which contains general paper and the decolorized paper tray 14b which contains decolorized paper.

The printing mode control section 23 determines whether the printing should be performed by the non-decolorable printing section 12a or the decolorable printing section 12b. The printing mode control section 23 controls the printing section 12 accordingly, and the determination result is transmitted to the paper selection control section 24. The paper selection control section 24 selects whether decolorable paper is taken from the decolorized paper tray 14b or general paper is taken from the general paper tray 14*a*. The selected paper is transported to the printing section 12.

In the non-decolorable printing section 12*a*, printing is performed on the paper taken out from the general paper tray 14*a* or the decolorized paper tray 14*b*, using non-decolorable recording material. As illustrated in FIG. 1, the non-decolorable printing section 12*a* includes photoconductive drums 12K, 12C, 12M and 12Y, an intermediate transfer belt 12B and a fixing device 12F.

Latent images corresponding to color data of black (K), cyan (C), magenta (M) and yellow (Y) are formed on the photoconductive drums 12K, 12C, 12M and 12Y, respectively. After that, toners of the colors corresponding to the latent images are supplied from a developing roller (not illustrated), developed, and then transferred as toner images onto the intermediate transfer belt 12B.

The toner images of each color transferred onto the intermediate transfer belt 12B are secondarily transferred onto the paper in a transfer position T. The paper, with the secondarily transferred toner images, is transported to and fixed in the fixing device 12F. After that, the paper is discharged from the printing output section 25 via an output port, and is sent to the finisher device 16.

The decolorable printing section 12*b* is an ink jet type printing device which performs the image printing by using, for example, decolorable ink that is a decolorable colorant as the decolorable recording material. The decolorable printing section 12*b* includes printing heads 10K, 10C, 10M and 10Y corresponding to decolorable inks of black (K), cyan (C), magenta (M) and yellow (Y), respectively, and performs the printing on the recording paper with the decolorable ink by ejecting the corresponding ink from each printing head.

In addition, for the decolorable ink that is the decolorable colorant, for example, leuco dye or the like can be used. The decolorable ink is decolored at approximately 80° C. to 100° C. when heated.

The image reading section 11 is a general image reading device which generally includes a copy function, an image scanner function or the like. The image reading section 11 is also used when scanning the document and obtaining the facsimile data to be transmitted via the telephone line IF section 26.

Figure 3:
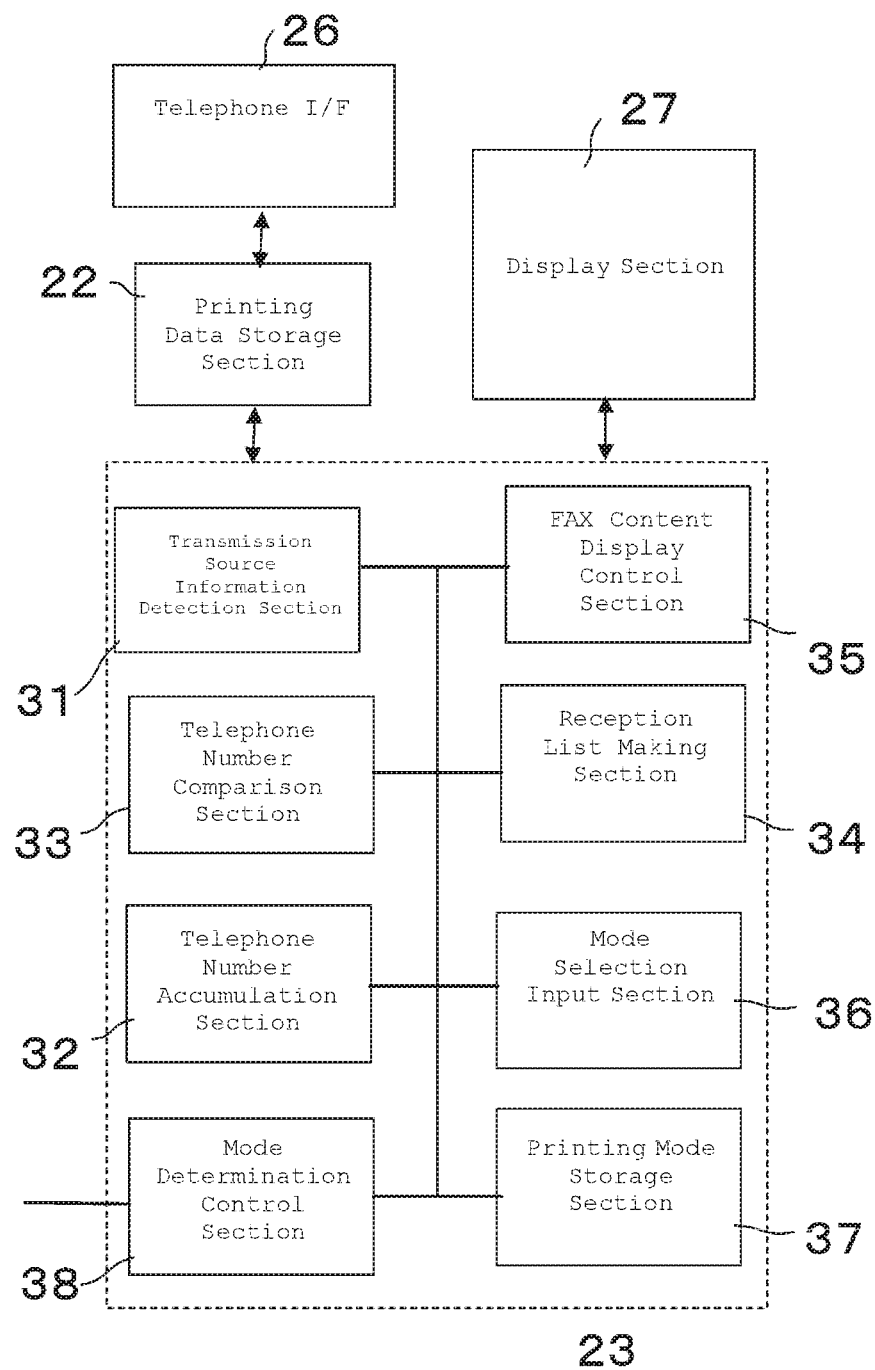
FIG. 3 illustrates an example configuration of a printing mode control section, according to first embodiment.

FIG. 3 illustrates an example configuration of the printing mode control section 23. The printing mode control section 23 includes a transmission source information detection section 31 which detects information or the like of a transmission source of the received FAX, a telephone number accumulation section 32 which registers a telephone number in advance on a non-decolorable printing permission list and a decolorable printing permission list depending on the printing mode, a telephone number comparison section 33 which compares the telephone number registered in the telephone number accumulation section 32 with the telephone number detected by the transmission source information detection section 31 and determines whether printing should proceed with decolorable printing or non-decolorable printing, a reception list making section 34 which makes a list of the received FAXes, a FAX content display control section 35 which displays a content of the FAX data on a display screen of the display section 27, a mode selection input section 36 which accepts a user input for selecting the printing mode, a printing mode storage section 37 which stores the selected printing mode as described below, and a mode determination control section 38 which controls each section.

The FAX receiving information and the FAX data are received in the printing data storage section 22 and the printing mode control section 23, for example, via the telephone line IF section 26. The received FAX data is stored in the printing data storage section 22. A received date, time, content or the like of the FAX data stored in the printing data storage section 22 is sent to the reception list making section 34 and is stored with the telephone number or the like detected in the transmission source information detection section 31.

In the embodiment, there are three modes defining whether printing of the FAX data is to be performed with the non-decolorable printing section 12*a* or with the decolorable printing section 12*b*. A first printing mode is a printing mode in which all printing is performed in the decolorable printing section 12*b*. A second printing mode is a printing mode in which printing is performed in the decolorable printing section 12*b* when the telephone number of a transmission source of the FAX data is not acquired and is not included in a registration telephone number list. A third printing mode is a printing mode in which printing is performed in the decolorable printing section 12*b* when the telephone number of the transmission source of the FAX data is listed in the registration number list.

A display example of the mode setting screen, in which setting of the three printing modes is displayed on the display screen of the display section 27, is illustrated in FIG. 5. Buttons are displayed for selection of the first printing mode, the second printing mode and the third printing mode and one of these is selected. Other settings are shown on a selection screen illustrated in FIG. 6 and the setting is performed by selecting these. The selection of the decolorable printing can be performed individually. Icons for canceling and registration are also displayed. If the setting is registered, the setting is saved.

In addition, in the second printing mode, the telephone numbers in the registration number list stored in the telephone number accumulation section 32 and the received telephone number of the transmission source of the FAX are compared in the telephone number comparison section 33. If the telephone number of the transmission source is listed in the list, the non-decolorable printing is performed. If the telephone number of the transmission source is not listed in the list and if the telephone number of the calling source cannot be acquired from the transmission source telephone number, the decolorable printing is performed.

In the third printing mode, the telephone numbers in the registration number list stored in the telephone number accumulation section 32 and the telephone number of the transmission source of the received FAX are compared in the telephone number comparison section 33. Then, if the telephone number of the transmission source is listed in the list, the decolorable printing is performed. If the transmission source telephone number is not listed in the list, the non-decolorable printing is performed.

That is, the printing is performed in accordance with the printing mode selected in advance by the user on the screen of the display section 27 illustrated in FIG. 5. The selected printing mode is input and stored in the printing mode storage section 37.

Figure 4:
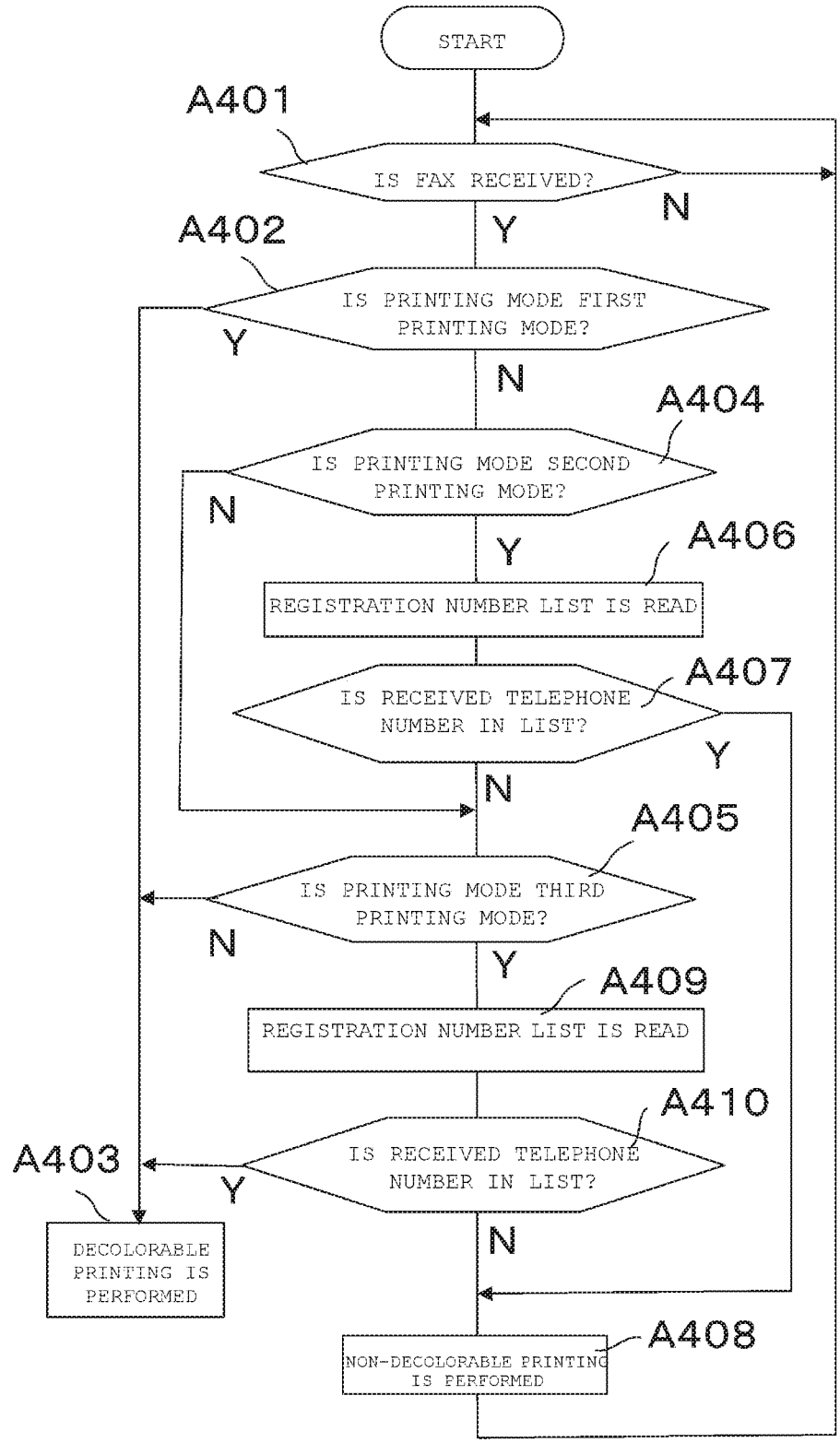
FIG. 4 illustrates an example flowchart of operations, according to the first embodiment.

Next, the operation of the embodiment is described, based on the flowchart illustrated in FIG. 4. In act A401, whether or not the FAX is received via the telephone line IF section 26 is monitored. When the FAX is received, access to the printing mode storage section 37 is performed and which one of the three printing modes is the current printing mode is detected. If the printing mode is the first printing mode, the process moves to act A403 and the decolorable printing is performed in the decolorable printing section 12*b*.

If the printing mode is not the first printing mode (NinA402), it is determined in act A404 whether or not the printing mode is the second printing mode. If the printing mode is not the second printing mode, in act A405, it is determined whether or not the printing mode is the third printing mode.

In act A404, if it is determined (Y in A404) that the printing mode is the second printing mode, in act A406, the registration number list stored in the telephone number accumulation section 32 is read.

Next, in act A407, it is determined whether or not the telephone number of the transmission source of the FAX data is in the registration number list. The determination is carried out by comparing the telephone numbers of the registration number list stored in the telephone number accumulation section 32 and the received telephone number of the transmission source of the FAX in the telephone number comparison section 33.

If the telephone number of the transmission source which is received is listed in the registration number list (Y in A407), the non-decolorable printing is performed in act A408. On the other hand, if the telephone number of the transmission source which is received is not listed in the registration number list (N in A407), the process moves to act A405. In act A405, it is determined whether or not the printing mode is the third printing mode by querying the printing mode storage section 37.

In act A409, if the printing mode is the third printing mode, the registration number list is read from the telephone number accumulation section 32 and it is determined whether or not the telephone number of the transmission source of the FAX which is received is listed in the list by comparing the telephone numbers in the telephone number comparison section 33 in act 410.

If the telephone number of the transmission source of the received FAX data is present in the registration number list (Y in A410), the process proceeds to act A403 and the decolorable printing of the received FAX is performed.

On the other hand, in act A410, when the telephone number of the transmission source of the received FAX data is not in the registration number list, the process proceeds to act A408 and the non-decolorable printing is performed in the non-decolorable printing section 12a on the general paper or the decolorable paper taken out from the general paper tray.

In addition, in act A405, even if it is determined that the printing mode is not the third printing mode, the process proceeds to act A403 and the decolorable printing is performed in the decolorable printing section 12b.

According to the embodiment, decolorable or non-decolorable printing is automatically selected and the printing is performed accordingly, without the user deciding which type printing is performed when a particular FAX is received.

(Second Embodiment)

In the above described first embodiment, the received FAX data is automatically decolorable printed or non-decolorable printed depending on the printing mode and the telephone registration number list. However, in a second embodiment, whether the decolorable printing is performed or the non-decolorable printing is performed can be decided while the user looks at the list or the content of the received FAX data.

Figure 7:
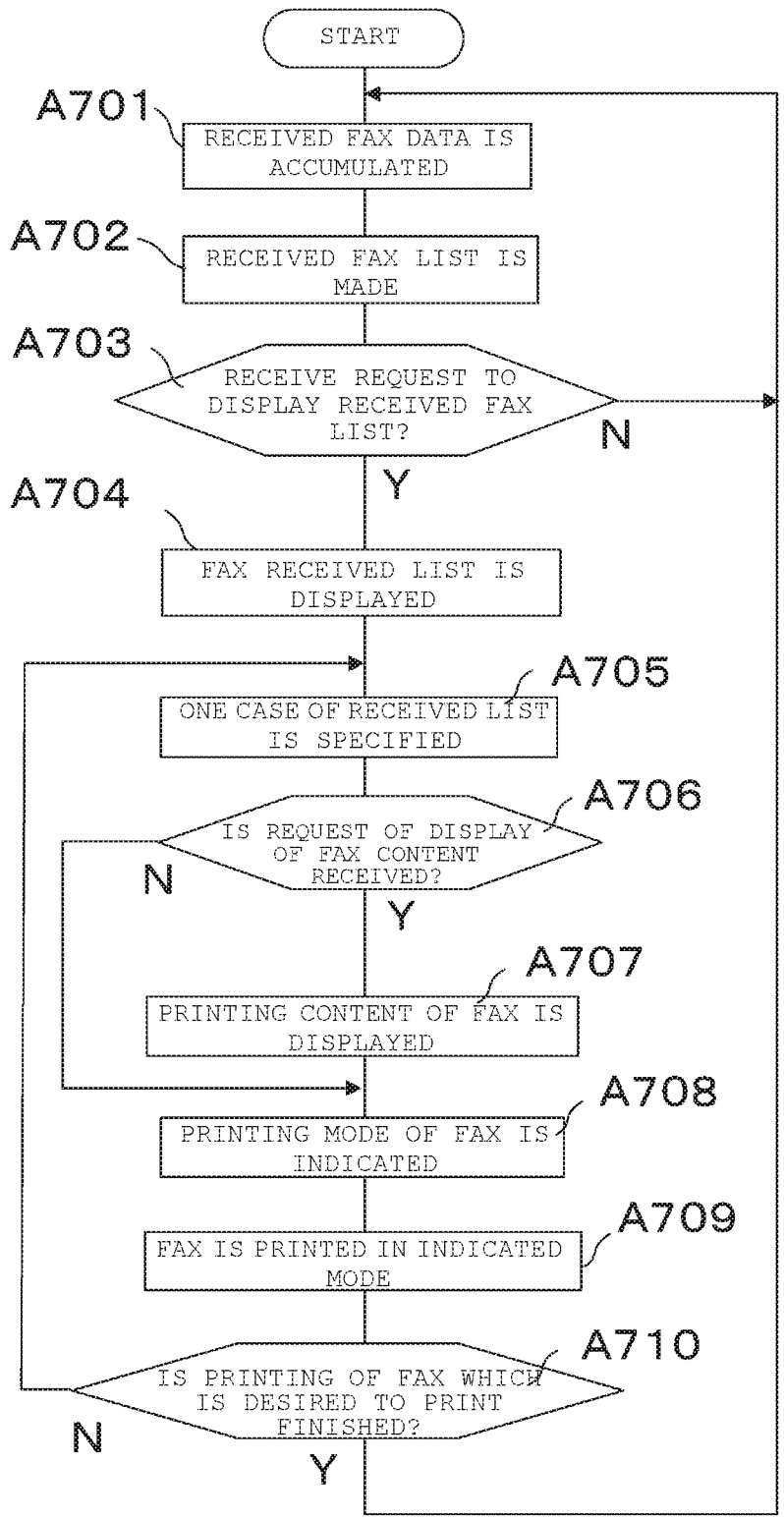
FIG. 7 illustrates an example flowchart of operations, according to a second embodiment.

The second embodiment is now described. An example configuration of the embodiment is similar to FIGS. 2 and 3. An example flowchart of operations of the embodiment is illustrated in FIG. 7.

In act A701, the received FAX data is accumulated in the data storage section 22. In act A702, the received FAX list of the received FAXes is made in the reception list making section 34.

In act A703, it is determined whether or not the user requests display of the received FAXes. The request by the user is performed on the screen with a display button (not illustrated) of the display section 27. In act A704, if the request is received from the user in act A703, the received FAX list is displayed on the display screen of the display section 27. A display example thereof is illustrated in FIG. 8. The telephone number of the transmission source of the received FAX as described above or a name of the other party, received date and time, and the number of the received sheets are displayed in the reception order.

In act A705, the user specifies one case in the received FAX list, which is desired to be printed. The user specifies the case, for example, by a cursor 81 of the mouse on the display screen.

In act A706, a phrase (not illustrated) querying whether or not the content of the received FAX data of the specified case is to be displayed on the screen. It is then determined whether or not the user requests the display of the content of the received FAX data of the specified case.

When the user requests the display of the content of the received FAX data of the specified case (Y in A706), the content of the received FAX data of the specified case is displayed on the display screen of the display section 27 in act A707. After that, the process returns to the screen illustrated in FIG. 8 again.

In act A708, instruction of the printing mode is performed by clicking an icon 83 of the decolorable printing or an icon 84 of non-decolorable printing, after the user identifies the content of the received FAX data.

Accordingly, in act A709, the printing for which the mode is instructed, in other words, the decolorable printing or the non-decolorable printing is performed.

In act A710, when the printing of the received FAXes which are desired to be printed by the user is not finished yet (N in A710), the process returns to the act A705 again and the received FAX which is desired to be printed is specified. As described above, the process returns to act A701 and the received FAX data is accumulated and the received FAX list is made in act A702, after the user completes the printing of all received FAXes which are desired to be printed. Of course, receiving of the FAX data and making of the list thereof in act A701 and act A702 are continued in parallel even when the printing is performed as described above.

According to the second embodiment, it is possible to decide whether the decolorable printing or the non-decolorable printing is performed while looking at the content of the received FAXes. Accordingly, it is possible to reduce sufficiently the FAXes for which the non-decolorable printing is performed and the effect of paper saving is large.

In an alternative embodiment, the first embodiment and the second embodiment described maybe joined together. In other words, a list can be made in advance indicating that fax data received from listed telephone numbers is to be printed in the decolorable printing section 12b or in the non-decolorable printing 12a, and then the user can select the printing mode of only the received FAXes which are not included in the list.

In addition, although not illustrated in FIG. 7, a special type of FAX—for example, a confidential FAX—may be displayed in the received FAX list in FIG. 8. It is also possible to set that the printing is, for example, performed in the non-decolorable printing section 12a. In addition, it is also possible to set the display for the special type of FAX in advance so that the content is not displayed.

In the above embodiments, the MFP having the facsimile function is described. However, the exemplary embodiment is not limited to the MFP and may be generally applied to a facsimile apparatus which transmits and receives FAX data.

As described above, according to the exemplary embodiment, the facsimile apparatus can easily perform the non-decolorable printing and the decolorable printing selectively in accordance with the conditions.

In the above embodiments, it is determined whether the decolorable printing is performed or the non-decolorable printing is performed by comparing the telephone numbers. However, generally, it is not limited to the telephone number and it may be the information which specifies the transmission source. In the above embodiments, the case where the facsimile data is received via the telephone line (the telephone line IF section) is described. However, an exemplary embodiment is not limited to this case and it is possible to obtain a similar effect even though the facsimile data is received via a network (a network IF section).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A facsimile apparatus comprising:
a communication interface configured to receive facsimile data;
a data storage device;
a non-decolorable printing section configured to print a content of the facsimile data on a recording medium using a non-decolorable colorant;
a decolorable printing section configured to print the content of the facsimile data on a recording medium using a decolorable colorant; and
a processor configured to:
control the data storage device to store, prior to the facsimile data being received, a plurality of facsimile transmission source information,
control the data storage device to store the received facsimile data,
detect transmission source information of the received facsimile data, determine whether the detected transmission source information is included in the previously stored plurality of facsimile transmission source information, and
control printing of the content of the received facsimile data based on whether the detected transmission source information is determined to be included in the
the received facsimile data is printed in one of the non-decolorable printing section and the decolorable printing section when transmission source information is determined to be included in the previously stored plurality of facsimile transmission source information, and
the received facsimile data is printed in the other one of the non-decolorable printing section and the decolorable printing section when the detected transmission source information is determined to not be included in the previously stored plurality of facsimile transmission source information.

2. The facsimile apparatus according to claim 1, wherein the processor controls printing of the content of the facsimile data in the decolorable printing section when the detected transmission source information is determined to be included in the previously stored plurality of facsimile transmission source information.

3. The facsimile apparatus according to claim 1, wherein the processor controls printing of the content of the facsimile data in the non-decolorable printing section when the detected transmission source information is determined to be included in the previously stored plurality of facsimile transmission source information.

4. The facsimile apparatus according to claim 1, wherein the transmission source information is a telephone number.

5. The facsimile apparatus according to claim 1, wherein the decolorable colorant is a heat decolorable colorant that is decolored by heating to a decolorable temperature or higher.

6. The facsimile apparatus according to claim 1, further comprising:
an input section configured to receive a printing mode input selection from a user, wherein:
if the received printing mode input selection corresponds to a first printing mode, the processor controls printing of the content of the facsimile data in the decolorable printing section when the detected transmission source information is determined to be included in the previously stored plurality of facsimile transmission source information, and
if the received printing mode input selection corresponds to a second printing mode, the processor controls printing of the content of the facsimile data in the non-decolorable printing section when the detected transmission source information is determined to be included in the previously stored plurality of facsimile transmission source information.

7. The facsimile apparatus according to claim 1, wherein the processor controls printing of the content of the facsimile data in the decolorable printing section when the transmission source information of the received facsimile data cannot be determined.

* * * * *